April 8, 1969 L. UPSHUR 3,437,797
ELECTRONIC DEFECT COUNTER
Filed Sept. 17, 1965

INVENTOR
LITTLETON UPSHUR

BY
Cushman, Darby & Cushman
ATTORNEYS

United States Patent Office 3,437,797
Patented Apr. 8, 1969

3,437,797
ELECTRONIC DEFECT COUNTER
Littleton Upshur, Greensboro, N.C., assignor to Burlington Industries, Inc., Greensboro, N.C., a corporation of Delaware
Filed Sept. 17, 1965, Ser. No. 488,167
Int. Cl. G06f 7/38; G06g 7/02
U.S. Cl. 235—92                    12 Claims

ABSTRACT OF THE DISCLOSURE

Apparatus for counting the number of service operations that a machine operator performs and for preventing fraudulent or inadvertent attempts on the part of the operator to register a false number of counts wherein a first time interval is determined by the charging of a capacitor through a potentiometer so a count cannot be registered until after the passing of the first time interval. This first time interval commences with the initiation of the service operation. A second time interval is initiated at the completion of the service operation and is determined by a second capacitor and resistor combination.

---

Figure 1:
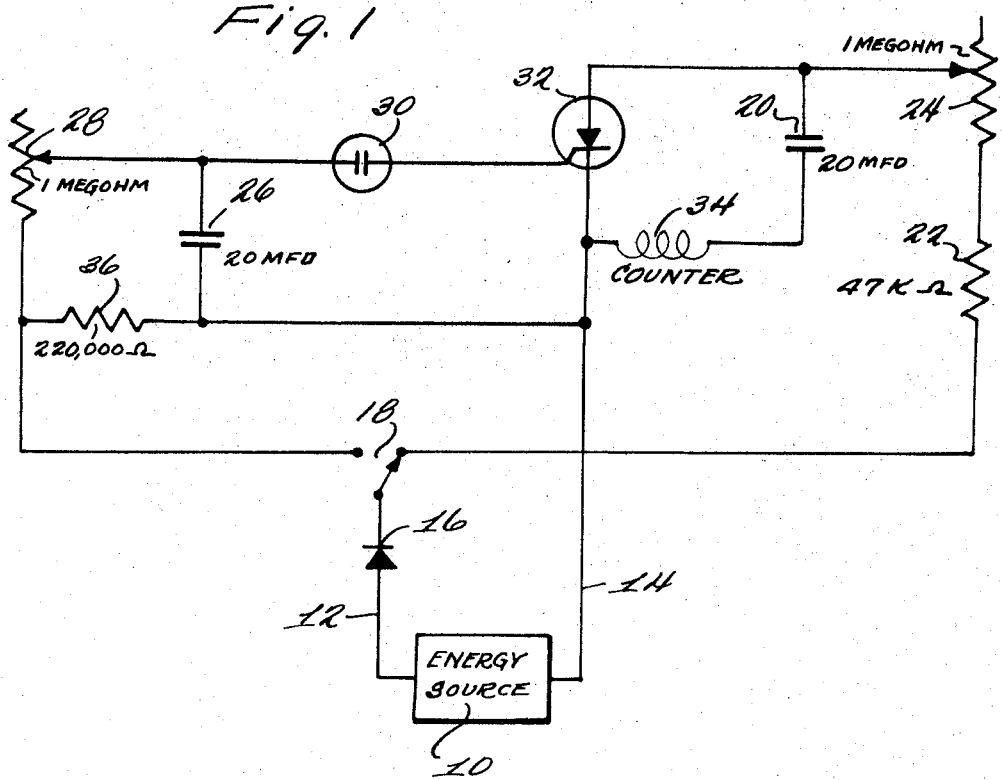

The invention relates in general to apparatus for counting the number of service operations that a machine operator performs and, in particular, the invention relates to apparatus for preventing fraudulent or inadvertent attempts on the part of the operator to register a false number of counts of the service operations performed by the operator.

This invention is related to the generic invention described in the application of Myron S. Stringer, Ser. No. 488,168, also filed Sept. 17, 1965.

In the manufacture of articles where there are a large number of items to be inspected to determine whether they are perfect or whether they will need to be repaired and especially in the case where one operator inspects hundreds of items per day and repairs some, there has been in the past no adequate way to control whether the operator is given adequate time for repair, is passing articles that need repair, or is falsifying the number of articles that have been repaired.

As a typical example, in the manufacture of ladies' sheer hosiery, there are operations generally termed inspecting/pairing, repairing, and mending which consist of matching two stockings of the same identical size, inspecting these for flaws or defects, and, if necessary, repairing the defect to a quality level that will pass a predetermined standard. In the past there has been no method other than the operator's count to determine whether the operator was mending or repairing the number of stockings she reported as repaired in a normal day's working period.

Accordingly, it is an object of the invention to provide an improved apparatus for accurately counting the number of repair or service operations that a machine operator performs.

It is also an object of the invention to provide improved apparatus for preventing or discouraging attempts on the part of a machine operator to register false counts of the number of service operations performed.

Another object of this invention is to provide improved fraud prevention apparatus for establishing a first predetermined minimum time interval commencing with the initiation of a service operation during which no count of the service operation can be registered.

Another object of the invention is to provide improved fraud prevention apparatus for establishing a second predetermined time interval commencing with the completion of a service operation during which no count can be registered.

A brief description will now be given of an illustrative embodiment of the invention for carrying out the above-mentioned objects.

Assume the operator is inspecting hosiery, and she finds a defective hose. There is of necessity some type of tool or instrument, which is used to repair the hosiery. If it has been predetermined that it takes a certain length of time for the operator to remove this tool from its resting position and move it to the position for repair of the stocking, registering the count of this repair operation should be delayed on the counter until the time required for the working tool to reach the work area has elapsed. Briefly, this is accomplished by a mechanical tripping of a delayed action timer counter which will register the count only after the predetermined time interval has passed, thereby eliminating the falsification of the counter if the operator claims to have repaired more than the actual number of defective stockings.

As varying amounts of time are necessary to repair defective stockings (since the length or degree of defects vary), a variable time element is introduced between the time when the work tool is removed from its holder and when it is replaced on the holder; therefore, the counter control mechanism is in a state of rest or dead time until the work tool used to repair defective stockings is placed within its holder. At this time the counter control is again activated and a second predetermine time is established which allows the operator to place the repaired stocking back into the production flow; therefore, no new count can be registered if the work tool is again removed from the holder before this allotted time to put the repaired goods into the work flow has passed.

Hence, it can be readily understood if an operator tries to falsify the count by removing the work tool momentarily and replacing it upon its rest area, there is no action of the count register. In addition, if the tool is subsequently removed to repair defective stocking and replaced in less time than the minimum predetermined time cycle, there is no action of the count register. The time intervals may be established by resistor-condenser combinations used to actuate or prevent actuation of the counter.

Figure 2:
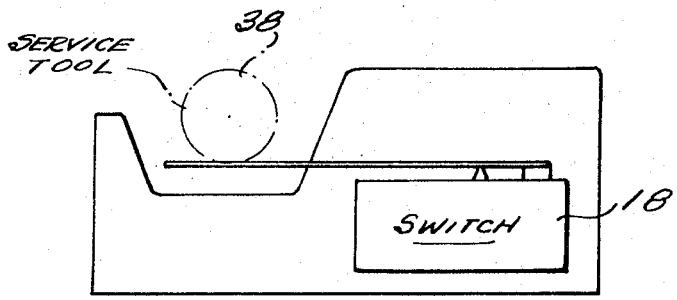

In order to more fully understand the invention, a detailed description will now be given of an illustrative embodiment where reference should be made to the accompanying drawings in which:

FIGURE 1 is a schematic of the circuitry for establishing the time intervals which must elapse before the counter can be actuated and FIGURE 2 is a diagrammatic illustration of one embodiment of a counter control mechanism for controlling the circuitry illustrated in FIGURE 1.

Reference should now be made to FIGURE 1, which shows the timing elements employed to establish the above-described time intervals. An energy source 10 is connected to input lines 12 and 14, respectively. Rectification of the AC energy is accomplished by rectifier 16.

The setting of a single pole, double throw switch 18, when the service device is in the rest or not in use position, is as shown in FIGURE 1. Capacitor 20 is charged through resistor 22 and potentiometer 24 when switch 18 is in the position shown on the drawing.

When the service device is moved to the service area, switch 18 transfers to its other position. Capacitor 26 begins to be charged through potentiometer or variable resistor 28 at this time from energy source 10. When the voltage across capacitor 26 reaches a value equal to the breakdown voltage of bulb 30 filled with neon or a similar type gas, the bulb begins to conduct and current flows from the gate or control element to the cathode of silicon control rectifier 32. This throws the rectifier 32 into conduction and condenser 20 then discharges through the counter. If the voltage stored in condenser 20 is sufficient to operate the counter 34 then the counter registers one count.

A first predetermined time interval is thus established by the amount of time required for charging condenser 26 through potentiometer 28 where the first predetermined time interval commences with the initiation of the service operation.

When the service device is returned to its rest position after a service operation, voltage from source 10 is removed from the circuit containing condenser 26 by the transfer of switch 18 to its position shown in FIGURE 1. The condenser 26 then discharges through resistor 28 and bleeder resistor 36 so that it starts from essentially zero charge on the next counting cycle.

After the service operation is completed the operator returns the service device to its rest position thereby initiating a second predetermined time interval which must elapse before another count can be registered on the counter 34. The second predetermined time interval is established by adjusting potentiometer or variable resistor 24 until the required time is established to charge condenser 20 to the voltage necessary to operate the counter. Resistor 22 is employed to prevent actuation of the counter 34 when energizing source 10 is employed to energize condenser 20—that is, immediately after the transfer of switch 18 to the position shown in FIGURE 1, a large voltage is developed across resistor 22 as opposed to the coil of the counter 34 since the resistor 22 has a much greater value of resistance than the counter coil. This prevention of counter actuation takes place regardless of the setting of potentiometer 34.

If the service device does not remain in the rest position long enough to charge condenser 20 to the operating or actuating voltage of counter 34, then condenser 20 is discharged through the counter without registering a count.

Referring to FIGURE 2, a counter control mechanism is diagrammatically shown for controlling the circuitry described in FIGURE 1. The service tool is indicated at 38. Switch 18 is responsive to movement of the service tool 38. Switch 18 is incorporated into a rest device for the service tool 38. The switch 18 is actuated when the tool is placed on the tool rest so that condenser 20 is charged as described above. Moving the tool 38 from its rest position causes the switch 18 to transfer thereby initiating the first predetermined time interval. This arrangement of the switch 18 is, of course, only one way of actuating the switch. The switch could be incorporated into a hook in which the tool is hung when not in use. Movement of the hook would then actuate the switch. Further arrangements would naturally occur to one skilled in the art.

Thus there has now been described a device for preventing inadvertent or fraudulent actuation of a counter 34 by a machine operator, where the said counter registers the number of service operations performed by the said operator, the device comprising means (condenser 20) for actuating said counter, said actuating means being energized by an energy source 10, first switching means (silicon control rectifier 32) for permitting actuation of the said counter 34 by the said actuating means 20 after a first predetermined minimum time interval has elapsed from the initiation of the said service operation and means (potentiometer 28 and condenser 26) for establishing the said first time interval, means (neon bulb 30) responsive to the said means for establishing the first time interval to switch said first switching means after said first time interval has elapsed, second switching means (switch 18) for connecting said actuating means to said first time delay means in response to the initiation of a service operation and for connecting said actuating means to said energy source in response to completion of the said service operation and disconnecting the timing means (potentiometer 28 and condenser 26) from the energy source 10, means (bleeder resistor 36) for discharging condenser 26 upon completion of a service operation thereby insuring zero charge on condenser 26 at the start of the next counting cycle, means including actuating means 20 and potentiometer 24 for establishing a second predetermined time interval after the completion of said service operation, the second time interval being determined by the amount of time required to charge condenser 20 to a voltage level sufficient for energizing counter 34 and means (resistor 22) for preventing actuation of counter 34 by energy source 10 when switch 18 is initially transferred in response to the completion of a service operation. Of course, various ways would occur to one skilled in the art for establishing the second time interval by means which would not include the actuating means. For instance, the condenser 20 may be charged from another resistor condenser combination.

Illustrative values of the components are given on the drawing. The values are given only for the purpose of illustrating a working embodiment and there is no intention to limit the invention to these particular values.

While the invention has been described in its preferred embodiment, various changes could be made without departing from the spirit and scope of the invention. Therefore, the terminology used in the specification is used for the purpose of clarification and not limitation, the scope of the invention being defined by the appended claims.

What is claimed is:

1. Apparatus for preventing fraudulent or inadvertent actuation of a counter by a machine operator, where said counter registers the number of service operations performed by said operator comprising:
    counter actuating means;
    first switching means for enabling actuation of said counter by said actuating means;
    first time delay means for switching said switching means after a first predetermined time interval elapses from the initiation of said service operation;
    second time delay means for preventing actuation of said counter by said actuating means until a second predetermined time interval elapses from the completion of said service operation; and
    gas tube means for connecting said first time delay means to said switching means after said first predetermined time interval elapses, thereby switching said switching means.

2. Apparatus for presenting fraudulent or inadvertent actuation of a counter by a machine operator, where said counter registers the number of service operations performed by said operator comprising:
    first time delay means for establishing a first predetermined time interval from the initiation of one of said service operations;
    first switching means responsive to said means for establishing the first time interval;
    a source of energy;
    actuating means energized by said source of energy;
    second time delay means for establishing a second predetermined time interval after the completion of said service operation;
    said actuating means being energized to a level sufficient to actuate said counter only after said second time interval elapses;
    said switching means responsive to said first time delay means only after said first predetermined time interval elapses to permit actuation of said counter by said actuating means;
    second switching means for connecting said energy source to said first time delay means upon initiation of the said service operation and for connecting said energy source to said second time delay means upon completion of said service operation; and
    where said first time delay means includes a resistor and condenser, said condenser being charged by said energy source to establish said first predetermined time interval.

3. Apparatus as in claim 2 where said resistor may be varied to establish said first predetermined time interval.

4. Apparatus as in claim 2 where said second time delay means includes said actuating means and a resistor, said actuating means being responsive to said energy source for establishing said second predetermined time interval.

5. Apparatus as in claim 4 where said resistor is variable.

6. Apparatus as in claim 4 where said second switching means comprises a silicon controlled rectifier responsive to the first time delay means after said first predetermined time elapses.

7. Apparatus as in claim 6 including gas tube switching means for connecting said first time delay means to said switching means in response to the condenser of said first time delay means accumulating a predetermined amount of charge.

8. Apparatus as in claim 7 including means for preventing the actuation of said counter when the said second switching means is initially switched upon completion of the service operation.

9. Apparatus for preventing fraudulent or inadvertent actuation of a counter by a machine operator, where said counter registers the number of service operations performed by said operator, comprising:
  means for actuating said counter, said actuating means including a condenser which is charged from an energy source;
  first switching means for enabling said actuating means to energize said counter, said first switching means having a control element;
  first time delay means for establishing a first predetermined time interval including a first potentiometer and second condenser chargeable from said energy source, the control element of said first switching means being responsive to the voltage developed across said second condenser to enable said actuating means to energize said counter after said first predetermined time interval elapses;
  second time delay means including a second potentiometer and said actuating means for establishing a second time interval which must elapse before the said condenser of actuating means accumulates sufficient charge from said energizable source to actuate said counter; and
  second switching means responsive to the initiation of said service operation to connect said energy source to said first time delay means and also responsive to the completion of said service operation to connect said energy source to said second time delay means.

10. Apparatus as in claim 9 including means for preventing said counter from being actuated by said energy source when said energy source is initially connected to said second time delay means upon completion of the service operation.

11. Apparatus as in claim 10 where said first switching means is a silicon-controlled rectifier with its control element responsive to said first time delay means and its anode-cathode circuit in circuit with said counter and said actuating means.

12. An apparatus as in claim 11 where said first and second potentiometers are respectively variable to establish said first and second predetermined time intervals.

References Cited

UNITED STATES PATENTS 2,790,602 4/1957 Jeppson.
3,044,699 7/1962 Smith.
3,227,190 1/1966 Richards _____ 235—92 X MAYNARD R. WILBUR, *Primary Examiner.*

GREGORY J. MAIER, *Assistant Examiner.*